(12) United States Patent
Fischer et al.

(10) Patent No.: US 7,003,094 B2
(45) Date of Patent: Feb. 21, 2006

(54) ADAPTIVE INTERFERENCE CANCELLATION FOR ADSL

(75) Inventors: Jonathan Herman Fischer, Longmont, CO (US); Donald Raymond Laturell, Allentown, PA (US); Vladimir Sindalovsky, Perkasie, PA (US)

(73) Assignee: Agere Systems Inc., Allentown, PA (US)

(*) Notice: Subject to any disclaimer, the term of this patent is extended or adjusted under 35 U.S.C. 154(b) by 596 days.

(21) Appl. No.: 09/730,781

(22) Filed: Dec. 7, 2000

(65) Prior Publication Data

US 2002/0072331 A1    Jun. 13, 2002

(51) Int. Cl.
*H04M 9/08*       (2006.01)

(52) U.S. Cl. .................. 379/406.01; 379/392.01; 379/416

(58) Field of Classification Search ................ 379/406, 379/93.05, 406.01, 392.01, 416; 375/346, 375/350, 285; 455/67.73; 370/207
See application file for complete search history.

(56) References Cited

U.S. PATENT DOCUMENTS

| | | | | |
|---|---|---|---|---|
| 4,689,804 A | * | 8/1987 | Srinivasagopalan et al. | 375/346 |
| 5,570,395 A | * | 10/1996 | Myers | 375/346 |
| 5,764,704 A | * | 6/1998 | Shenoi | 375/324 |
| 5,930,310 A | * | 7/1999 | Freeman | 375/346 |
| 6,052,420 A | * | 4/2000 | Yeap et al. | 375/346 |
| 6,173,021 B1 | * | 1/2001 | Bingel et al. | 375/346 |

* cited by examiner

*Primary Examiner*—Sinh Tran
*Assistant Examiner*—Walter F Briney, III

(57) ABSTRACT

An ADSL front end is implemented with an adaptive AM interference canceller to cancel out either a carrier signal of an interfering AM radio signal, or a carrier signal and its sidebands of an interfering AM radio signal, from a received ADSL signal. By canceling an interfering AM radio signal rather than simply filtering out the relevant interfered with frequency band, the interfered with frequency band remains useable for ADSL transmission. In one embodiment, a reference AM radio receiver is either fixedly or adaptively tuned to the carrier frequency of an interfering AM radio station, and the received signal in the frequency band surrounding that carrier frequency is digitized and provided to an adaptive interference canceller. The adaptive interference canceller adaptively adjusts a time delay and phase of the generated AM interference signal to optimize cancellation at a hybrid of the same AM radio signal received as interference over a subscriber line. The AM interference canceller may include a Hilbert bandpass filter, tuned to an appropriate carrier frequency by, e.g., an FFT analyzer. An LMS module adaptively adjusts the parameters of the I and Q channels of the Hilbert filter. In another embodiment, instead of including a reference AM radio receiver, only the carrier signal is removed from the received ADSL signal, leaving the presumably less significant sidebands intact. Preferably, a ratio of differential mode coupling to common mode coupling of the interfering AM radio station is determined to result in a better cancellation of the coupled AM interference signal.

31 Claims, 10 Drawing Sheets

DIFFERENTIAL MODE/COMMON MODE ADAPTATION CIRCUIT

TRADITIONAL ANALOG BANDWIDTH USAGE

DSL BANDWIDTH USAGE

SPECTRAL DISTRIBUTION OF RADSL CAP

SPECTRAL DISTRIBUTION OF RADSL-DMT

ADAPTIVE INTERFERENCE CANCELLATION FOR ADSL

BACKGROUND OF THE INVENTION

1. Field of the Invention

This invention relates generally to digital subscriber line (DSL) solutions. More particularly, it relates to a method and technique for adapting a bandwidth of a discrete multi-tone (DMT) DSL solutions.

2. Background

Digital subscriber line (DSL) technology transforms inexpensive copper phone lines into high speed, high value data service lines. DSL refers to a group of digital data services which support data speeds from 128 Kbps to 7 Mbps over standard copper phone lines. The first true DSL was ISDN and while that service has become popular, the limited bandwidth options make it less appealing than the newer high speed alternatives that have been developed.

DSL was originally designed to allow regular phone services even in the event of power outages-in what is termed "lifeline POTs" or "Plain Old Telephone Service." This feature is still available in the asymmetric DSL (ADSL) and rate adaptive DSL (RADSL) variations of DSL. In fact, with ADSL and RADSL, users get the benefits of using not only a single pair of wiring, but get both high speed digital data services and their regular lifeline telephone service over that wiring.

Traditional analog voice services require 300 Hz to 3,400 Hz of bandwidth 521 on a local loop of copper wiring (i.e., the telephone line) between traditional central office switches and customer premises, as shown in FIG. 7. These same wires are, however, capable of carrying information at much higher rates when modern digital signal processing technologies are used. The explosive growth in Internet access, as well as remote LAN access and telecommuting has resulted in a high demand for faster data services. DSL technologies utilize a bandwidth 523 of up to 1.2 MHz (over 300 times the bandwidth of an analog phone call) as shown in FIG. 8, and allows data speeds of over 7 Mbps.

As its name implies, ADSL transmits an asymmetric data stream, with up to 7 Mbps downstream bandwidth (to the subscriber) and only up to 1 Mbps upstream bandwidth. The reason for this asymmetry has less to do with transmission technology than with the telephone cabling. Twisted pair telephone wires are bundled together in large cables. Fifty pair to a cable is a typical configuration towards the subscriber, but cables coming out of a central office may have hundreds or even thousands of pairs bundled together. An individual line from a central office to a subscriber is spliced together from many cable sections as they fan out from the central office. Twisted pair wiring was designed to minimize the interference of signals from one cable to another, but the process is not perfect. Signals do interfere with one another as frequencies and the length of line increase. In fact, if you try to send symmetric signals in many pairs within a cable, you significantly limit the data rate and length of line that you can attain.

Asymmetric solutions are targeted primarily at individual Internet subscribers who receive more information than they send. Businesses typically host web servers, requiring high-speed Internet bandwidth in both directions.

Two line coding schemes are possible with ADSL: Discrete Multi-Tone (DMT) and Carrierless Amplitude and Phase (CAP) modulation. Although the CAP version has been more widely deployed in trials, DMT is the version approved by ANSI's Working Group T1 E1.4 as the industry standard.

ADSL has two significant advantages. It is the fastest DSL technology that supports the maximum distance in the local loop. Moreover, it supports lifeline or Plain Old Telephone Service (POTS).

With ADSL, data and wireline POTS are provided as independent channels on a single line. Symmetric DSL modulation schemes require a separate voice line—two lines total—to provide both services. This is not a problem in most newer buildings which are usually wired for at least two lines, but ADSL does offer a significant edge in older houses and apartments served by a single line. These two advantages make ADSL the favored long-term solution among carriers and service providers addressing the consumer market.

With ADSL, both upstream and downstream speeds vary with distance. ADSL speeds can vary greatly based on a number of conditions. In areas where there is a large variance in the length of the local loop (distance from the subscriber to the central office), the gauge of the wire, and the condition of the line, it becomes difficult to determine what speeds should be provisioned over each line. It is for these reasons that Rate Adaptive ADSL (RADSL) was developed.

Rate Adaptive ADSL allows automatic, or provider specified, adjustment of the speed on the line. Rate Adaptive Asymmetric Digital Subscriber Line (RADSL) offers a downstream (from the central office or central site to residence) data rate of up to 7.0 Mbps and an upstream (from residence to the central office) speed to 1.0 Mbps. Some of the advantages of RADSL are reduced loop qualification efforts, maximized service coverage, a single product serves multiple applications, simplified deployment, reduced product inventory requirements, adaptability of data rate to changing loop conditions, the availability of bandwidth-based service offerings, and the simplification of service issues due to automatic rate adaptation.

FIG. 9 shows a typical RADSL configuration including a RADSL modem 400 at a subscriber's site. RADSL provides a solution most suitable for low-cost, high speed Internet applications.

Like ADSL, RADSL can use either Carrierless Amplitude Phase (CAP) modulation or Discrete Multi-Tone (DMT) modulation. RADSL technology automatically adjusts line speed based on a series of periodic tests that determine the maximum speed possible on a particular line. Since RADSL accommodates the maximum speed available across a particular line, much of the effort and/or guesswork can be taken out of provisioning ADSL. As with ADSL, RADSL supports both high-speed data and lifeline POTS service.

The primary difference between the RADSL-CAP and RADSL-DMT line cards is in the modulation technique used. CAP treats the entire frequency spectrum as a single channel and optimizes the data rate over that channel. DMT divides the bandwidth into sub-channels and optimizes the data rate for each sub-channel. CAP has been tested longer than DMT and is more widely deployed and used, but DMT has been accepted as the standard by the American National Standards Institute (ANSI) and the Telecommunications Standards Institute (ETSI).

Carrierless Amplitude Phase (CAP) modulation divides the spectrum into three parts; the voice band 510, the upstream communications band 512, and the downstream communications band 514, as shown in FIG. 10. The lower 4 Khz of bandwidth is the band utilized for regular analog voice transmission. Frequencies starting at 26 KHz are used for upstream data communications, and frequencies above 240 KHz are used for downstream data transmission.

The relevant standards committees (i.e., ANSI and ETSI) have approved Discrete Multi-Tone (DMT) technology for implementing broadband copper local loops to the home, and this same technology can be used with any telephone grade twisted pair copper wiring. The DMT technique breaks up the available bandwidth into multiple subchannels, and then modulates each band. Just as is done in CAP, the lower end of the spectrum is left alone for carrying the regular analog phone service. In ADSL DMT-systems, the downstream channels from 26 KHz to 1.2 MHz are divided into 256 4 KHz wide tones. The upstream channels spanning 26 KHz to 138 KHz frequencies are divided into 32 subchannels 613, as shown in FIG. 11. Each subchannel is used as a carrier with bit and power allocations according to the signal to noise ratio characteristics of the subchannel. Thus, the link transmission is optimized by running each of the subchannels at best possible data rates.

The received signal spectrum is broken down into 256 4 KHz bands using digital signal processing techniques after A/D conversion.

In the realm of heavy digital subscriber line (DSL) solutions, there are situations where the interference level relative to the useful signal is such that after applying the programmable gain to the received signal, the analog-to-digital converter input is primarily dominated by interference. Important to the principles of the present invention (as will be discussed) are both interference in the digital domain corrupting digital data as well as interference which may overload analog circuits before an analog-to-digital converter.

Discrete Multi-tone (DMT) modulation is known to offer the advantage of selecting tones with best signal to noise ratios (SNR) and leaving out tones affected by interference. However, there are situations where the interference level relative to the useful signal is still such that after applying the programmable gain to the received signal, the analog-to-digital converter input is primarily dominated by the interference, thereby causing deterioration of receiver performance.

One of the major sources of interference for DMT systems is AM radio interference 599, as shown in FIG. 12. AM radio signals span from about 540 KHz up to 1.6 MHz.

There are typical situations where AM radio interference can be particularly detrimental to a modem's performance. For instance, telephone line loops having unbalanced bridged taps or unbalanced home wiring may cause susceptibility to AM interference. In this case, AM interference results in a strong interference signal in the modem receiver which cannot be totally eliminated by conventional common mode rejection filters.

Other examples include long telephone line loops with high insertion loss, and telephone lines picking up AM radio interference coupled after line insertion loss. In such cases, a high PGA gain is required before analog-to-digital conversion to properly quantize the desired signal. But the presence of the large AM radio signal may overload the analog-to-digital converter if the PGA gain is high.

Other interference sources such as T1 crosstalk also tend to have higher spectral density at higher frequencies.

Ordinarily, the transmitted energy from an AM broadcast station that enters a telephone wire pair exists as a common mode signal. Many safeguards exist to protect a DSL modem from such a signal. However, on occasion, the coupled energy is very strong or may become a differential signal. A very strong AM radio common mode signal may cause overload of a DSL analog front end. Overload can cause the loss of 100 or more DMT carriers. On the other hand, a differential AM radio signal on the digital subscriber line makes the bandwidth occupied by the AM interference unusable for DMT ADSL reception. Each differential interference signal from an AM radio station will cause the loss of 4 to 5 DMT carriers.

All modulation techniques discussed, including all types of DSL techniques, are by way of example only, and should not serve to limit the following described invention in any way.

SUMMARY OF THE INVENTION

In accordance with the principles of the present invention, a digital subscriber line front end comprises a DSL receiver, a reference AM radio frequency signal, an AM interference canceller module, and a summer to combine a signal destined for the DSL receiver with an output of the AM interference canceller module.

A method of canceling an AM interference signal from a digital subscriber line signal in accordance with another aspect of the present invention comprises generating an AM interference replica signal. The generated AM interference replica signal is combined with the digital subscriber line signal.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention restores bandwidth in DMT service which is corrupted by commercial AM radio transmitters.

In accordance with the principles of the present invention, adaptive cancellation of AM interference is implemented in a DSL modem to preserve the data in the band segment that was affected by the AM interference. Higher data rates in the presence of AM interference may be obtained with adaptive cancellation than with filtering alone. The term 'cancellation' as used herein relates to the reduction of the amplitude of an undesirable component of a received signal.

Important to aspects of the present invention is that analog-to-digital conversion passes linearly both the intended signal as well as the interference so that digital signal processing can extract good bins (or bands) and remove bad bins (a bin being with reference to FFT algorithms). The present inventors realized that corruption can't be removed when analog-to-digital conversion overload occurs. Thus, preservation of linearity through an analog-to-digital conversion is important to the present inventive concepts.

The adaptive cancellation of AM interference may be implemented in, e.g., any ADSL client side consumer product.

Figure 1:
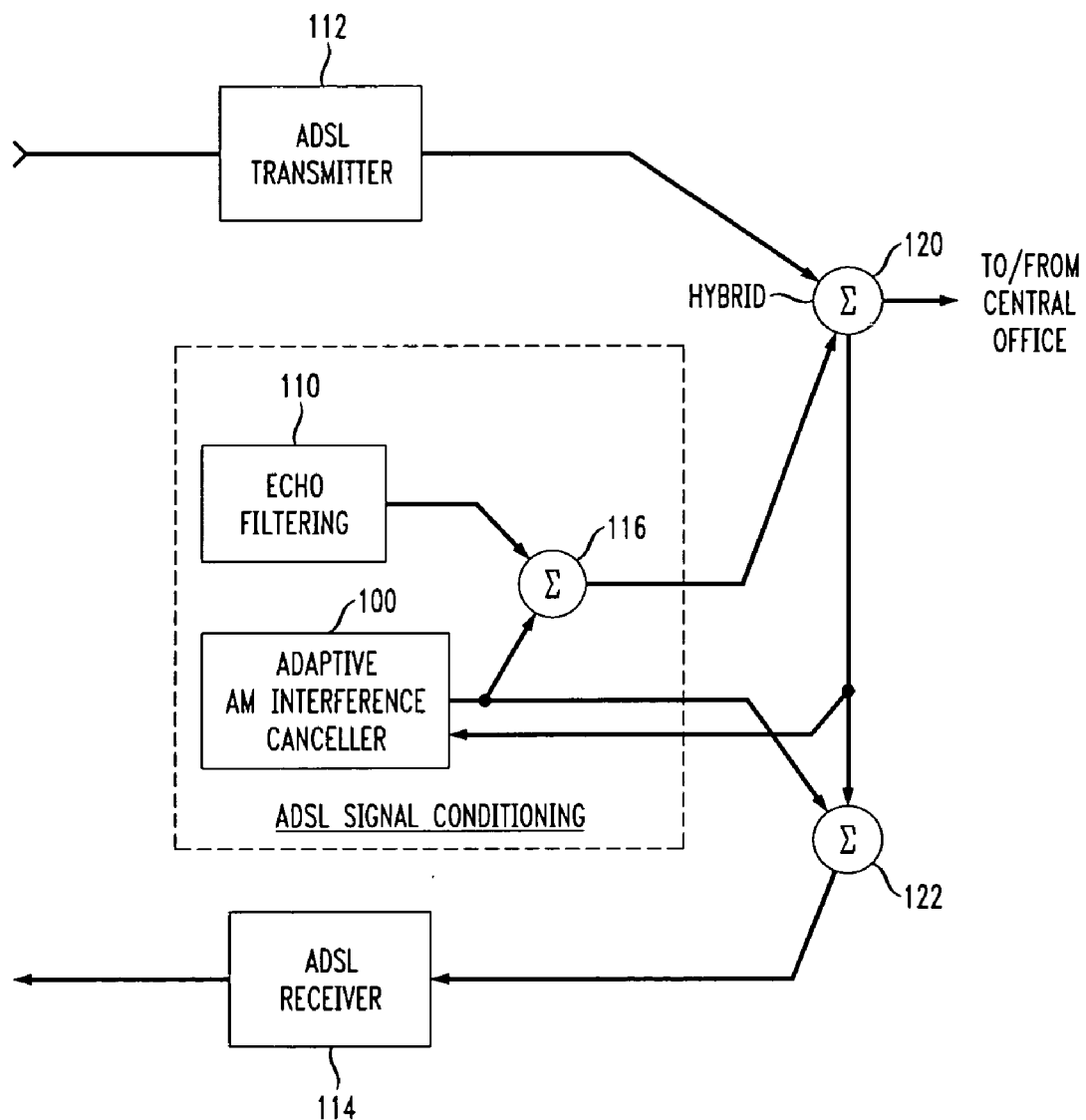
FIG. 1 shows an exemplary ADSL analog front end including an adaptive AM radio wave interference canceller, in accordance with the principles of the present invention.

FIG. 1 shows an exemplary ADSL front end 10 including an adaptive AM radio wave interference canceller 100, in accordance with the principles of the present invention. As shown in FIG. 1, an ADSL front end 10 includes a hybrid 120 which is connectable to service line from a central office, an ADSL transmitter 112, an ADSL receiver 114, the AM interference canceller 100, and a hybrid 120. The ADSL front end can also include summers 116 and 122 and an echo cancellation filter 110. The echo cancellation filter 110 provides an echo cancellation signal to the hybrid 120. The AM interference canceller 100 provides an AM interference canceling signal to the ADSL signal received by the hybrid 120.

The adaptive AM interference canceller 100 and optional echo filter 110, in accordance with the principles of the present invention, form an ADSL signal conditioning function to improve the quality of the ADSL communications.

As shown in FIG. 1, the AM interference canceling signal is summed digitally with an output of the echo cancellation filter at the summer 116 before presentation to the hybrid 120. However, the AM interference canceling signal may be presented to the hybrid 120 or a received signal path separate from the echo cancellation signal, within the principles of the present invention.

The adaptive AM interference canceller 100 generates a cancellation signal preferably equal in magnitude and opposite in phase to the AM interference component. The AM canceller 100 can generate a cancellation signal that accounts for the propagation of the AM interference.

To provide the best results, the adaptive AM interference canceller 100, in accordance with the principles of the present invention, should clearly identify the frequency of the most significant AM interference signal. Fortunately, it is found that the coupling of the AM radio station is rather narrow (e.g., about 20 KHz of spectrum for any one AM radio station).

Figure 2:
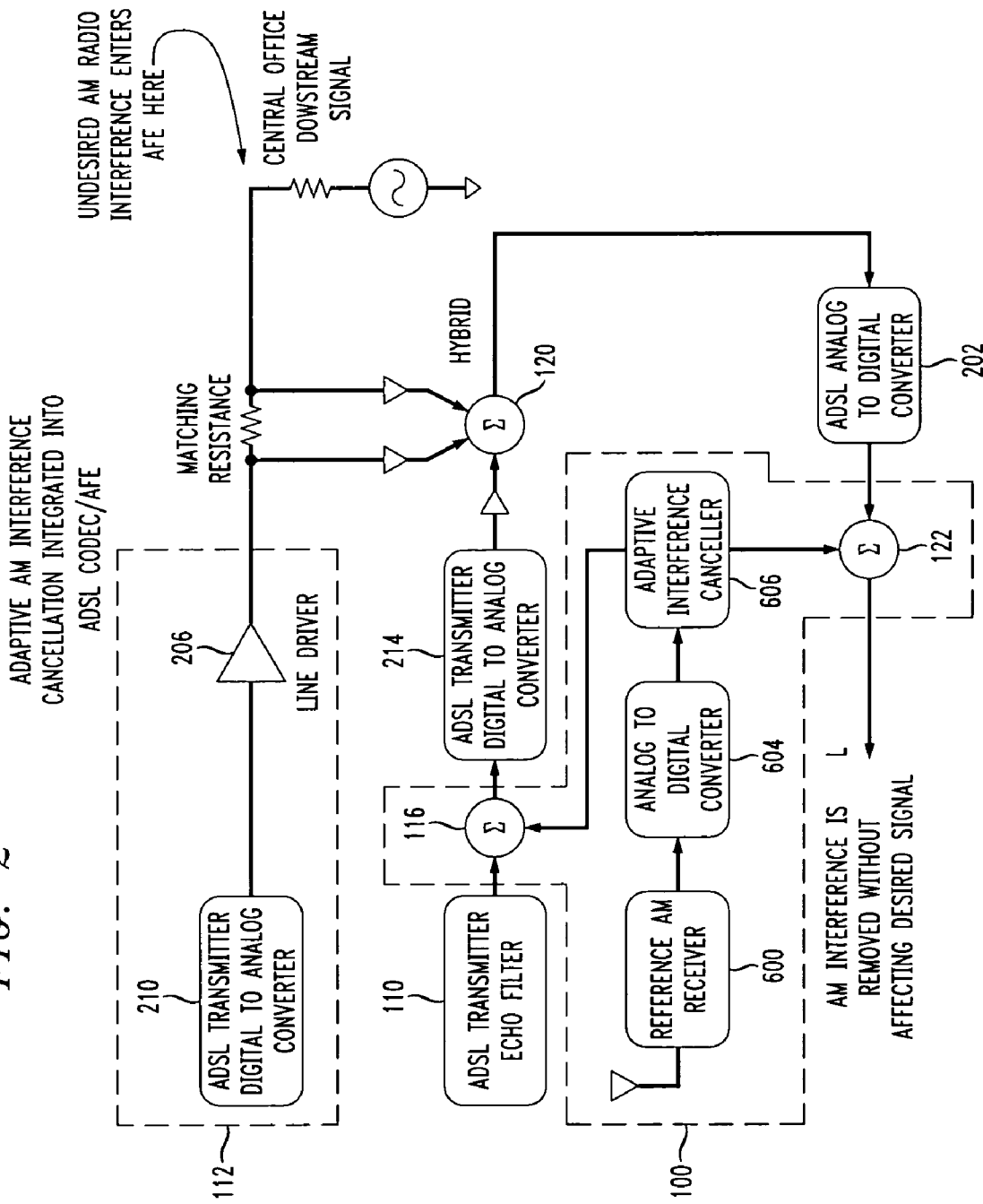
FIG. 2 is a more detailed depiction of the ADSL front end including an adaptive AM radio wave interference canceller as shown in FIG. 1.

FIG. 2 is a more detailed depiction of the ADSL front end including the adaptive AM interference canceller 100 shown in FIG. 1. In particular, the AM interference canceller 100 can include a digital summer 116, a reference AM radio receiver 600, an analog-to-digital converter 604, an adaptive interference canceller 606, and a digital summer 122.

It has been found that some ADSL receivers are subject to receiving a significant amount of AM radio interference, particularly if the subscriber is located close to an AM radio station transmitting tower. In such an instance, a very large AM radio component relating to the relevant AM radio stations (20 KHz of bandwidth for each station) is found in the received ADSL signal.

The adaptive interference cancellation implemented in the present invention takes advantage of the fact that AM radio waves travel faster through the air than they do through the ADSL subscriber line. In accordance with one aspect of the present invention, reception of the AM radio waves through the air allows an amount of time for relevant circuitry in the ADSL front end 10 to generate a suitable cancellation signal prior to reception of the relevant AM interference over the subscriber line and through the hybrid 120.

As shown in FIG. 2, the reference AM radio receiver 600 receives radio signals in a vicinity of the ADSL front end 10 using a suitable local antenna. In the disclosed embodiment, the reference AM radio receiver 600 is tuned into a relevant, interfering AM radio station such that only an interfering AM radio station signal (i.e., 20 KHz) is used as the basis of the AM interference cancellation signal. However, it is within the principles of the present invention to receive a larger portion of the AM frequency band, or even the entire AM frequency band.

An analog-to-digital converter 604 digitizes the received AM reference signal, and the digitized samples are input to an adaptive interference canceller module 606 for generation of an appropriate AM interference cancellation signal. The adaptive interference canceller 606 adaptively adjusts the amplitude and the phase of the interfering signal until the AM radio interference has been reduced or removed.

The exact time delay between the wireless reception of an AM radio signal and the corresponding reception of an AM interference signal is not known by the AM interference canceller 606, so an adaptive training is preferably implemented. This adaptive training should include an analysis of time of arrival to adapt for time of arrival differences that may exist as well as differences in frequency response of a given medium. Thus, part of the adaptation process suitably matches the time delay to reach an optimum cancellation of the interfering AM radio signal from the received ADSL signal.

To provide suitable cancellation, the adaptive AM interference canceller 100 should mimic the interference path, in a way much like echo cancellation techniques, then invert the replica signal with an appropriate amount of gain and perfectly subtract the inverted replica signal from the interference path at precisely the right time.

The AM interference cancellation signal is input to a digital summer 122 after an appropriate delay determined by the adaptive interference canceller 606, to provide cancellation of AM interference in the receive path. The AM interference cancellation signal may also be input to a digital summer 116 in the echo cancellation path to provide additional ADSL signal conditioning to the hybrid 120.

While the embodiments of the present invention utilize digital summers 116, 122, the principles of the present invention are equally applicable to the combination of a received ADSL signal with an AM radio interference cancellation signal in the analog domain using analog summers.

Figure 3:
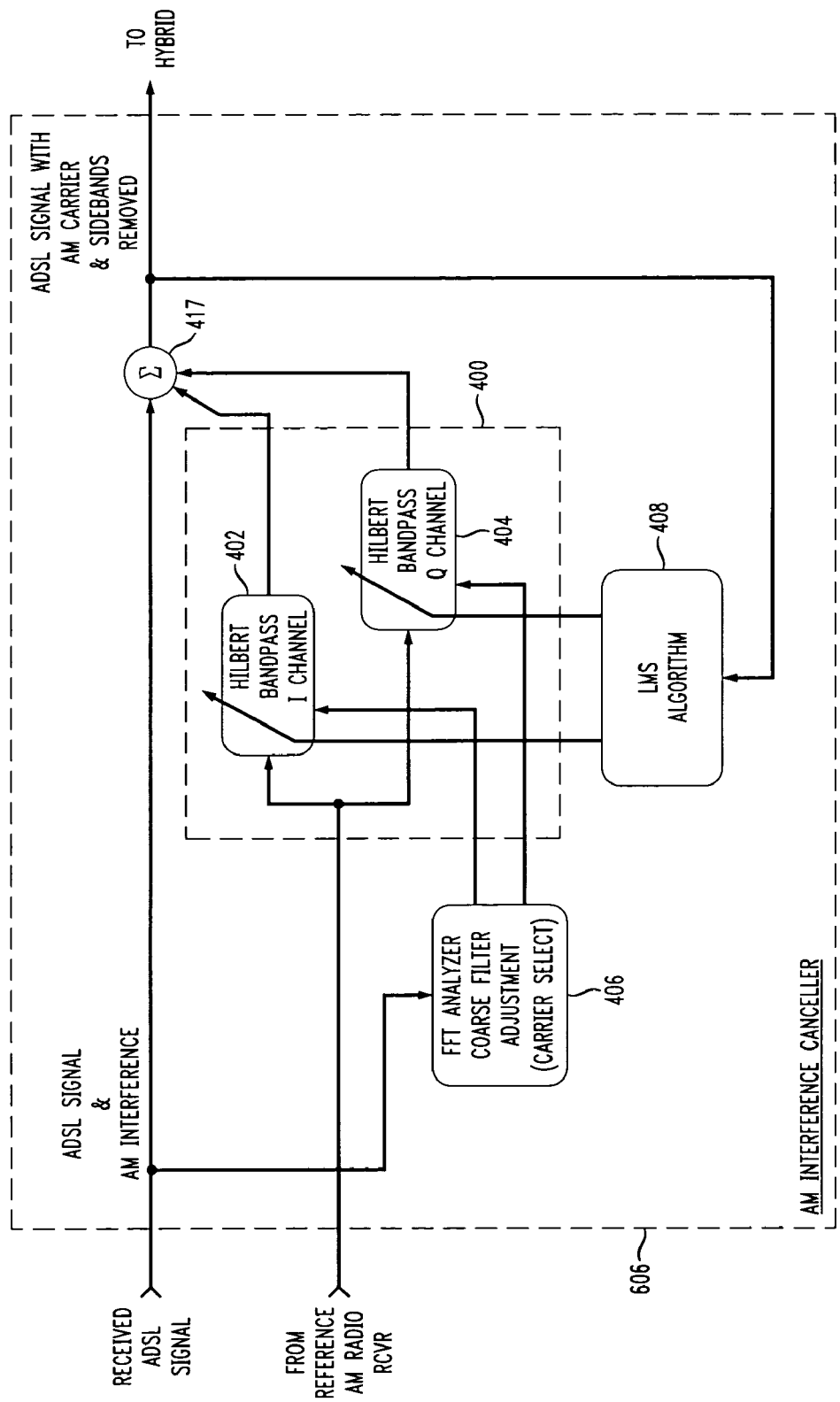
FIG. 3 shows a first embodiment of an AM interference canceller shown in FIG. 2, providing AM radio carrier and sidebands adaptive interference cancellation in accordance with the principles of the present invention.

FIG. 3 shows a first embodiment of the AM interference canceller 606 shown in FIG. 2, providing AM radio carrier and sidebands adaptive interference cancellation in accordance with the principles of the present invention. The canceller 606 receives an AM signal from the receiver 600 and receives an ADSL signal from the hybrid 120. The canceller 606 generates an output signal that is subtracted from the received ADSL signal (presumably including AM interference), to result in an ADSL signal with AM interference removed.

In particular, as shown in FIG. 3, a Hilbert bandpass filter 400 is formed by a Hilbert bandpass I channel filter 402 and a Hilbert bandpass Q channel filter 404. The Hilbert bandpass filter 400 may be implemented digitally in a suitable processor, e.g., in a microprocessor, a microcontroller, or a digital signal processor. While the Hilbert bandpass filter 400 is shown in the embodiment of FIG. 3, other types of bandpass filters may be implemented within the principles of the present invention.

The AM interference canceller 606 adaptively determines a largest or most significant AM radio station presumably contributing to the AM interference received by the ADSL receiver 114. In the disclosed embodiment shown in FIG. 3, a Fast Fourier Transform (FFT) analyzer provides a coarse filter adjustment to select a carrier signal corresponding to the most significant AM radio station. Thus, using this carrier frequency, the Hilbert bandpass filter 400 is coarse tuned to the center of the largest AM radio interference component identified by the FFT analyzer 406.

The AM interference canceller 606 can further include an LMS algorithm 408. The LMS algorithm 408 fine tunes the coefficients of the Hilbert bandpass filter I channel 402 and Q channel 404 to remove the AM carrier component as well as the sideband components relating to the most significantly interfering AM radio station signal. As a result, the intended DMT ADSL received signal is not affected by the cancellation of the interfering AM radio signal components. Other adaptive routines to tune a Hilbert bandpass filter may be used, not only the discussed LMS technique, within the scope of the present invention.

Figure 4:
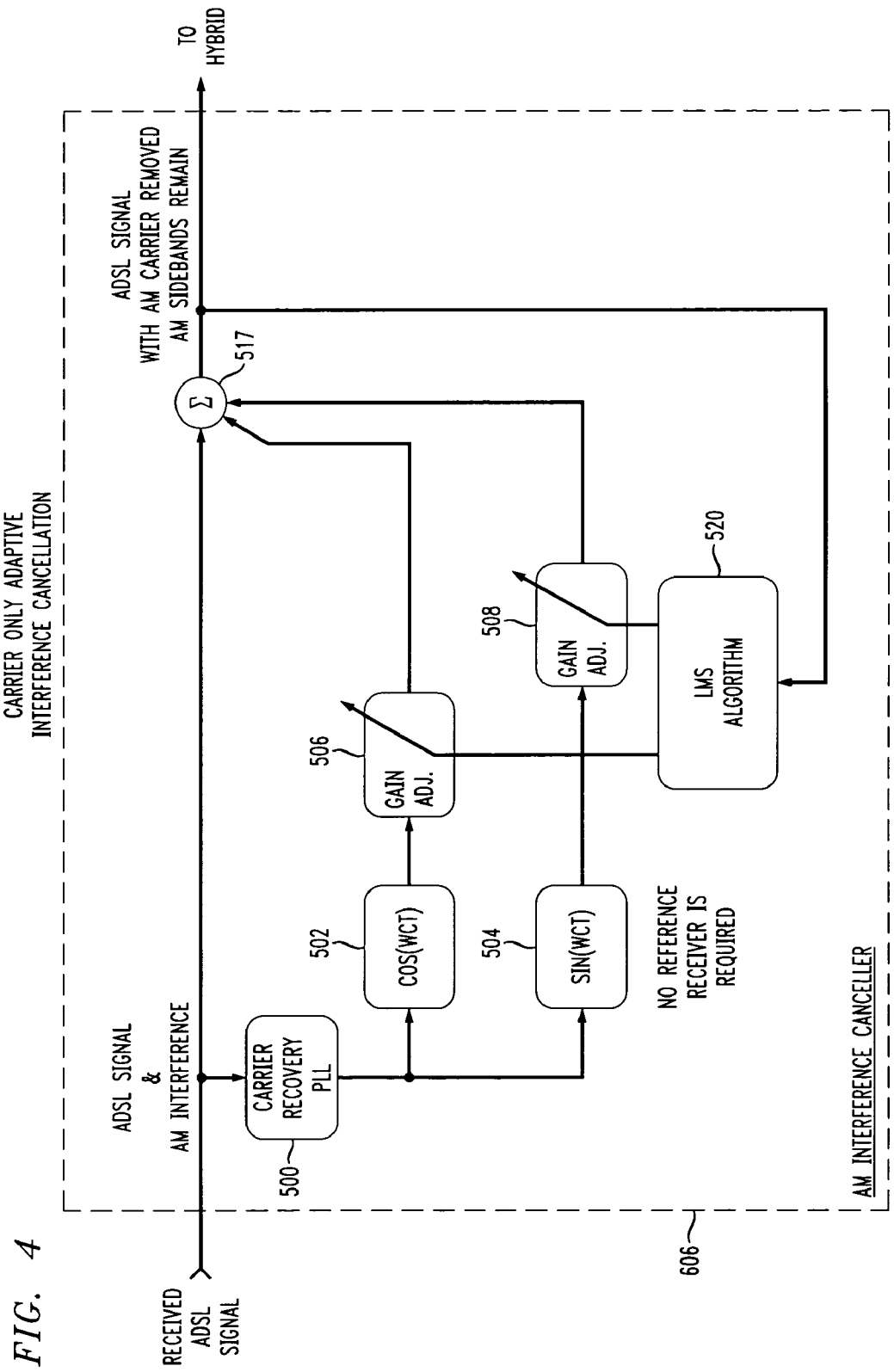
FIG. 4 shows a second embodiment of an AM interference canceller shown in FIG. 2, providing AM carrier only adaptive interference cancellation in accordance with the principles of the present invention.

FIG. 4 shows a second embodiment of the AM interference canceller 606 shown in FIG. 2. This embodiment of the canceller 606 implements a technique for rejecting only the carrier components of the interfering AM signal. The embodiment of FIG. 4 does not need to generate a cancellation signal relating to sideband components of the most significant AM radio signal, thereby greatly simplifying the system.

The embodiment of FIG. 4 recognizes that AM radio station signals typically include a strong carrier component, and thus implements a carrier only rejection technique (without knowledge of the associated sidebands). After removal of the carrier component, all that would be left is the sideband, leaving the bandwidth surrounding the removed carrier useable for more reliable ADSL communications.

In particular, as shown in FIG. 4, a reference AM receiver 600 (e.g., as shown in FIG. 2) is not necessary because only the carrier component of the AM signal is removed. The embodiment of FIG. 4 uses a phase locked loop to regenerate the equivalent carrier component using only the ADSL receive signal from the central office, as shown in FIG. 1. The amplitude of a sinusoid and a cosinusoid wave form is adjusted until the carrier component of the AM interference signal is removed.

Generally speaking, removing only the AM carrier signal is not as effective as removing both the AM carrier signal and the sidebands (e.g., as shown in the embodiment of FIG. 2). However, in some instances the sideband interference may be suitably low enough to ignore the leak of precision in the embodiment illustrated in FIG. 4.

Cancellation of only an AM carrier signal (and not the sideband frequency signals) may be most suitably implemented, e.g., when a reference receiver is not possible or practical.

To prevent analog-to-digital conversion overload, it is important that an analog cancellation process be present in the analog domain as well as in the signal processing domain.

The primary purpose of the embodiment of FIG. 4 (i.e., removal of only an AM carrier signal) is to reduce overload caused by AM interference, rather than attempting a more complete interference signal removal as is more possible with the embodiment of FIG. 3. The embodiment of FIG. 4 leaves the ADSL receiver system itself to overcome any remaining, less significant (and thus less interfering) AM interference.

In may in some instances be desirable to use the circuit of FIG. 4 to remove AM radio signal interference components before they cause overload to an analog-to-digital converter (e.g., the analog-to-digital converter 202 shown in FIG. 2). In such a case, a circuit that is capable of producing both differential and common mode correction signals is required.

Figure 5:
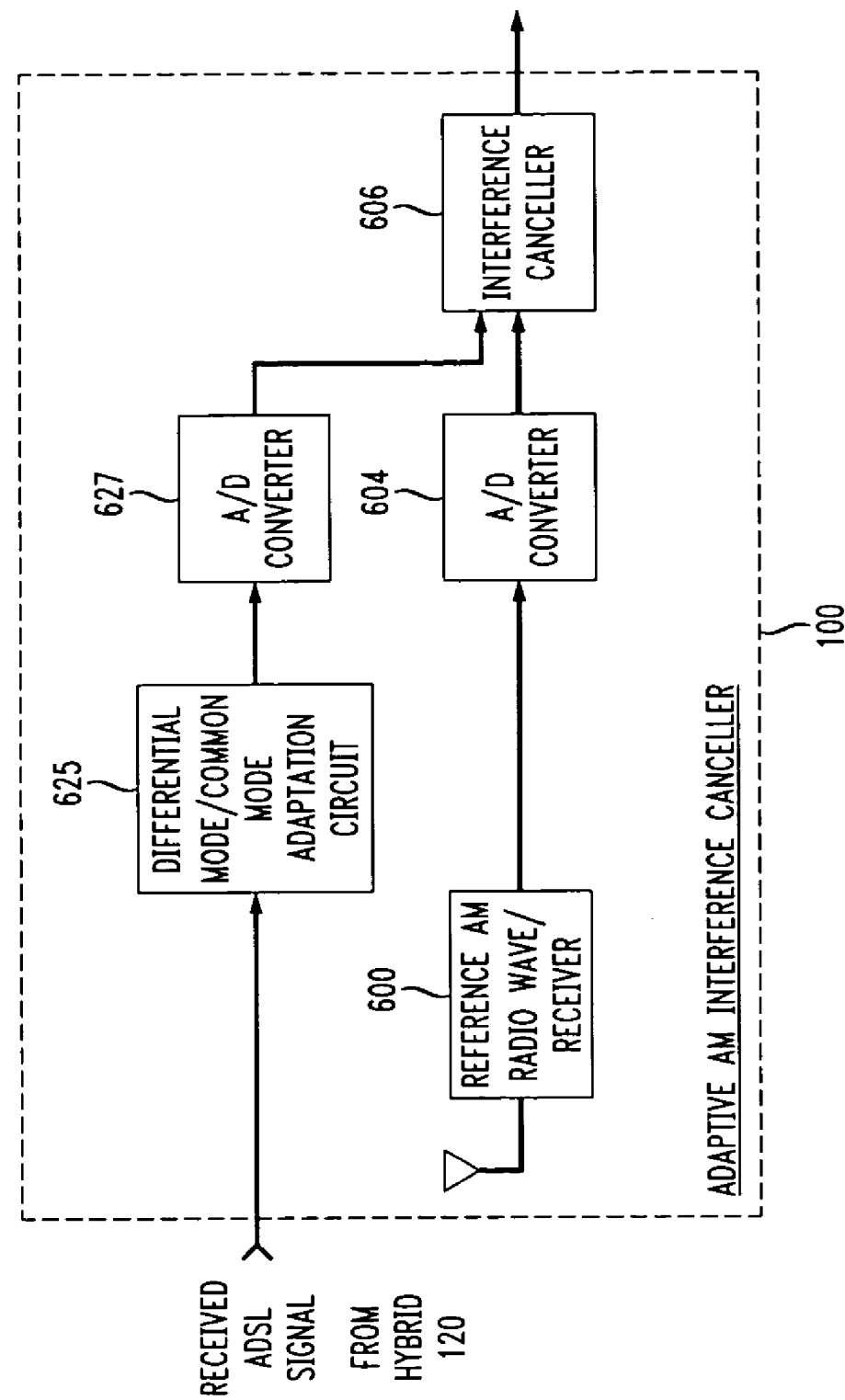
FIG. 5 shows another block diagram of an exemplary adaptive AM radio wave interference canceller similar to that shown in FIG. 2, but including a differential mode/common mode adaptation circuit, in accordance with the principles of the present invention.

FIG. 5 shows another block diagram of an exemplary adaptive AM radio wave interference canceller 100 similar to that shown in FIG. 2, but including a differential mode/common mode adaptation circuit 625 and associated analog-to-digital conversion channel 627, in accordance with the principles of the present invention.

The inventors have determined that the typical interfering AM radio signal couples to the subscriber line and ADSL receiver both in a common mode and in a differential mode. The differential mode/common mode adaptation circuit 625 shown in FIG. 5 adapts a ratio of common mode coupling of the interfering AM interference radio signal to differential mode coupling of the AM interference radio signal in suitably fine degradations.

The differential mode/common mode adaptation circuit 625 adjusts a ratio between differential mode coupling and common mode coupling of the interfering AM radio signal until a correct metric or ratio is adaptively determined. If only a common mode adaptation circuit were to be developed, any differentially coupled component of the AM interference signal would not be cancelled, and vice versa. If the uncancelled component is significant enough, the analog-to-digital converter 202 (FIG. 2) remains at risk of being overloaded. Though not necessary to practice the present invention, this ratio may be adjusted over time to account for more dynamic environments.

Figure 6:
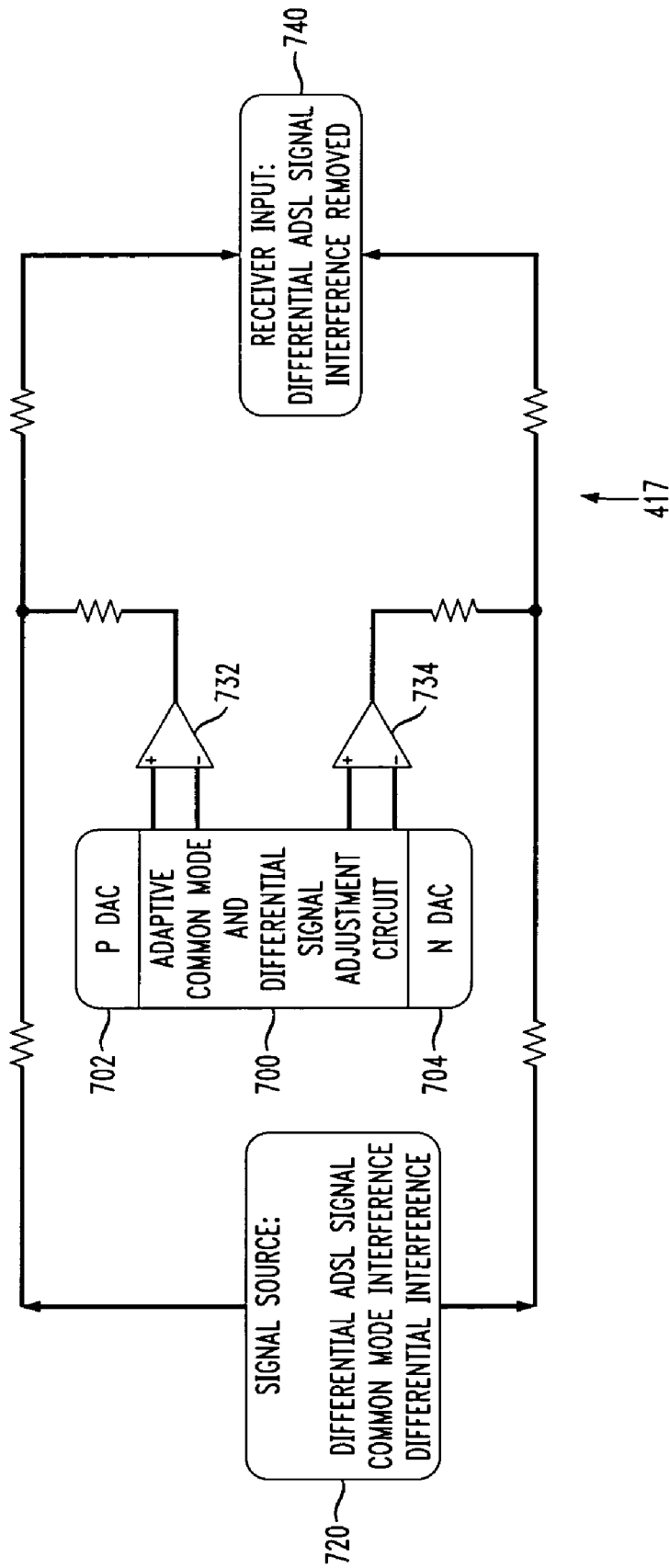
FIG. 6 shows an exemplary differential mode/common mode adaptation circuit shown in FIG. 5 used to remove a differential interference component or a common mode interference component, in accordance with the principles of the present invention.
Figure 7:
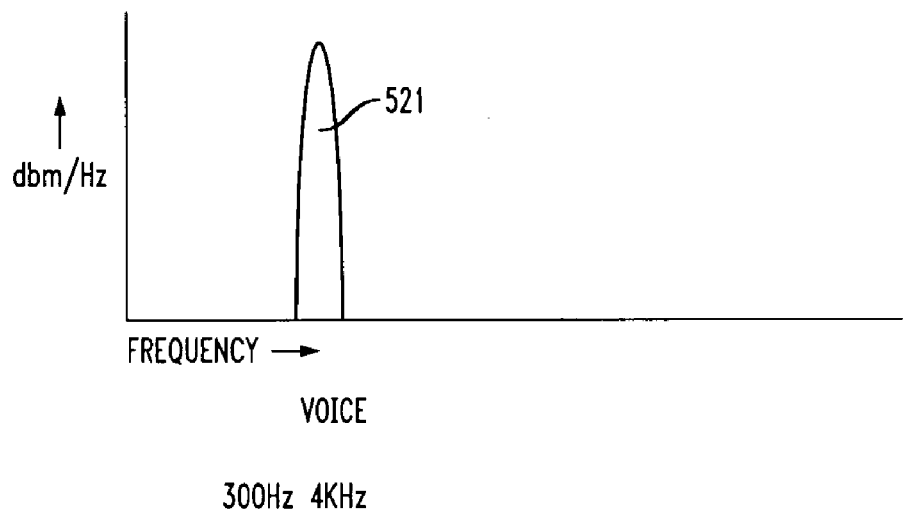
FIG. 7 shows the bandwidth of traditional analog Plain Old Telephone Service (POTS), from 300 Hz to 3,400 Hz, on a local loop of copper wiring (i.e., the telephone line) between traditional central office switches and customer premises.
Figure 8:
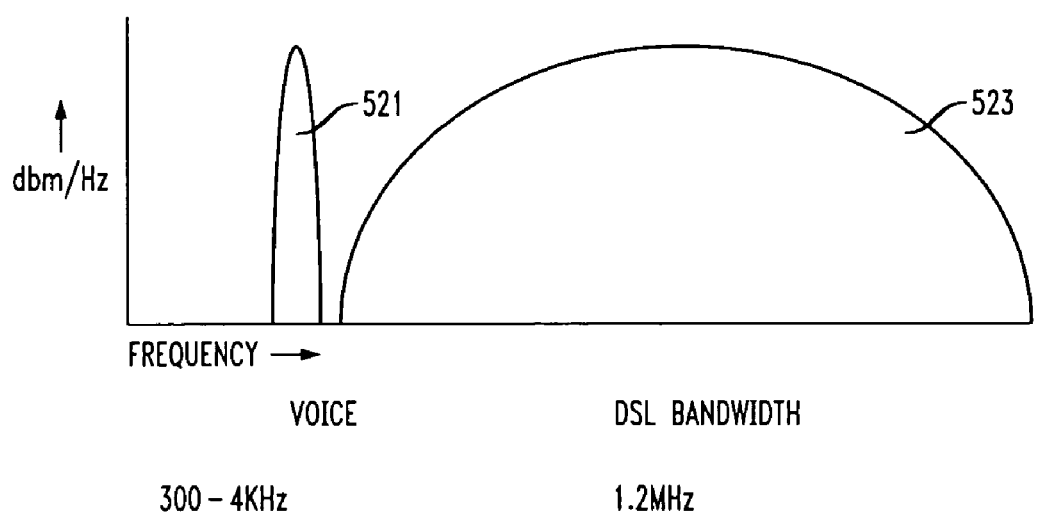
FIG. 8 shows typical DSL bandwidth usage of up to 1.2 MHz.
Figure 9:
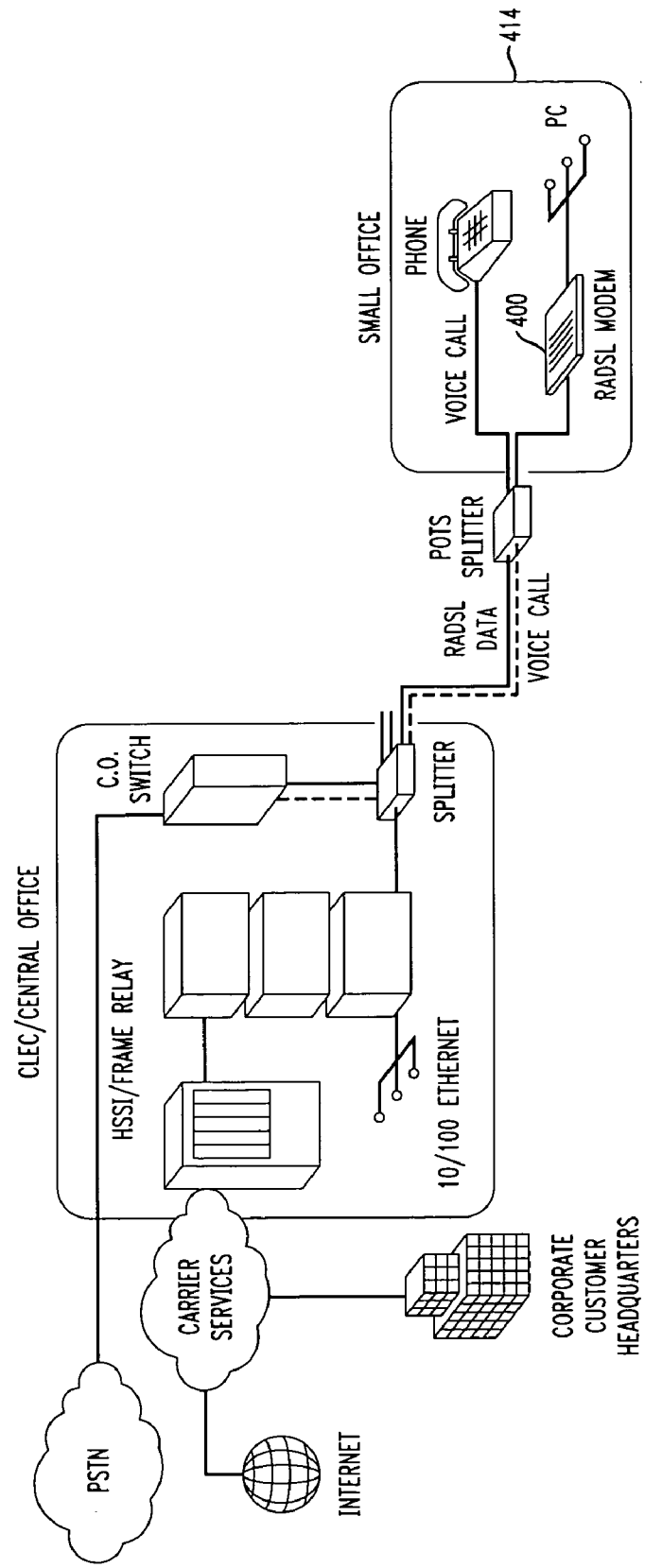
FIG. 9 shows a typical RADSL configuration including a RADSL modem at a subscriber's site.
Figure 10:
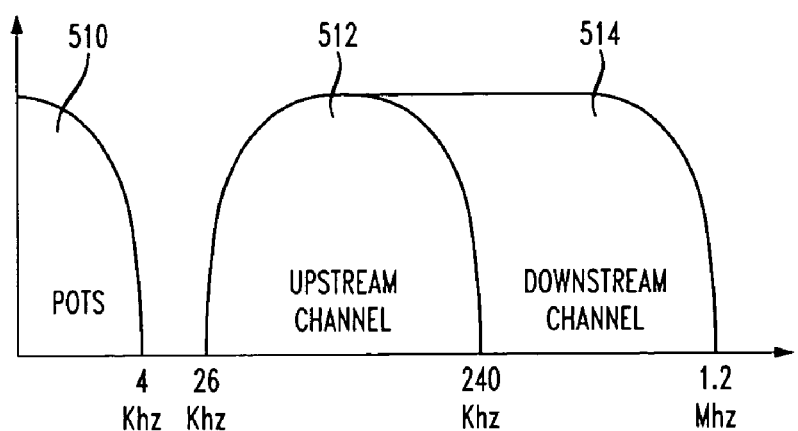
FIG. 10 shows the bandwidth utilized by RADSL Carrierless Amplitude Phase (CAP) modulation dividing the spectrum into a voice band, an upstream communications band, and a downstream communications band.
Figure 11:
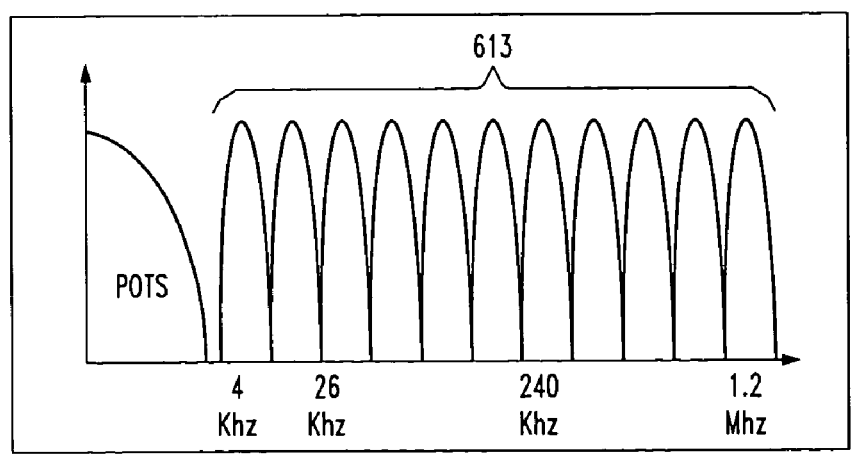
FIG. 11 shows the bandwidth utilized by RADSL-discrete multi-tone (DMT) techniques dividing the spectrum into upstream channels spanning 26 KHz to 138 KHz frequencies.
Figure 12:
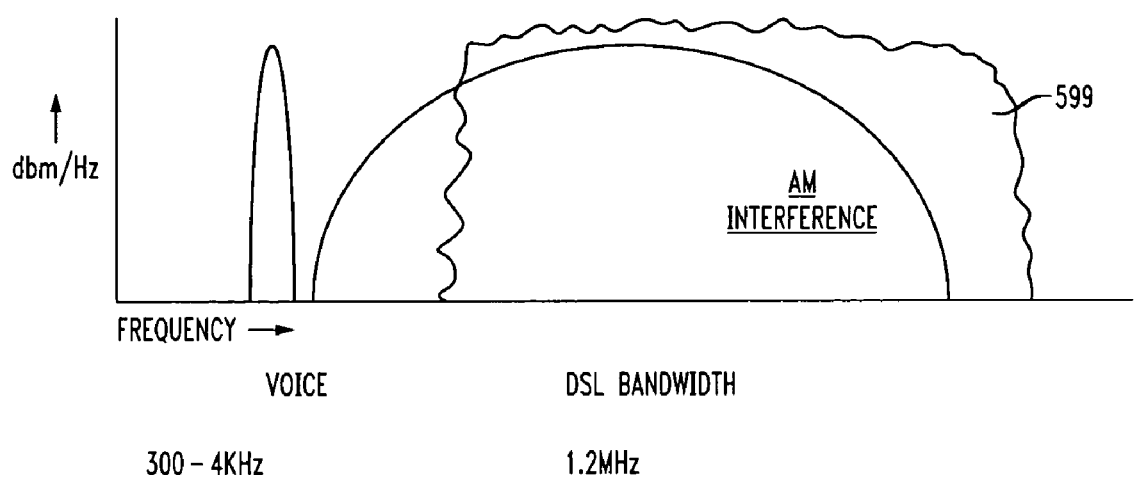
FIG. 12 shows AM radio interference as a major source of interference for DMT systems.

FIG. 6 shows an example of differential mode/common mode adaptation circuit 625 shown in FIG. 5. As indicated by the reference numeral 417 in FIG. 6, the circuit shown in FIG. 6 is intended to be implemented in the summing node 417 of FIG. 3.

In particular, as shown in FIG. 6, a positive digital-to-analog converter 702 and a negative digital-to-analog converter 704 are employed between the tip and ring of the subscriber line such that any combination of common mode and differential signal may be added to the existing signals on the tip and ring to cancel any interference that is coupled to the phone line either differentially or in common mode.

The present invention has applicability not only to DSL modulation, but rather to any modulation scheme utilizing echo cancellation. Thus, the present invention preserves usable bandwidth with respect to other modulation techniques, e.g., band splitting techniques.

Thus, in accordance with the principles of the present invention, only interference signals are removed from a received signal instead of both the interference signals and the underlying desired data signals as in prior art systems. As a result, the interfered with bandwidth remains useable, providing a higher throughput in a DSL modem than was otherwise available in the presence of AM radio signal interference.

While the invention has been described with reference to the exemplary embodiments thereof, those skilled in the art will be able to make various modifications to the described embodiments of the invention without departing from the true spirit and scope of the invention.

What is claimed is:

1. A DSL front end, comprising:
    a hybrid to provide a bi-directional interface with a communication channel, said hybrid to generate an output signal representative of a signal received from said communication channel;
    an AM interference canceller to output a signal representative of AM interference to said hybrid, said signal representative of said AM interference is based on a carrier component of said AM interference while ignoring a sideband component; and
    a digital summer to combine said output of said AM interference canceller with a signal based upon said output of said hybrid such that said AM interference in said DSL front end is substantially cancelled.

2. The DSL front end according to claim 1, wherein:
    said digital subscriber line is an asymmetric DSL (ADSL).

3. The DSL front end according to claim 1, further comprising:
    an adaptive circuit to determine an amount of differential mode coupling of said interfering AM radio signal with respect to an amount of common mode coupling of said interfering AM radio signal.

4. The digital subscriber line front end according to claim 1, further comprising:
    a reference AM radio wave receiver to output said signal representative of AM interference.

5. The DSL front end according to claim 1, wherein:
    said signal representative of AM interference is generated from a carrier signal recovery phase locked loop.

6. A DSL front end, comprising:
    a hybrid to provide a bi-directional interface with a communication channel, said hybrid to generate an output signal representative of a signal received from said communication channel;
    an AM interference canceller to output a signal representative of AM interference to said hybrid said signal representative of said AM interference is based on a carrier component of said AM interference while ignoring a sideband component; and
    a summer to combine said output of said AM interference canceller with a signal based upon said output of said hybrid such that said AM interference in said DSL front end is substantially cancelled;
    wherein said AM interference canceller comprises a Hilbert bandpass filter.

7. The DSL front end according to claim 6, wherein said AM interference canceller further comprises:
    an FFT analyzer to determine a frequency of a most significant AM radio signal.

8. The DSL front end according to claim 6, wherein said AM interference canceller further comprises:
    an LMS module to adjust a frequency of I and Q channels of said Hubert bandpass filter.

9. A digital subscriber line front end, comprising:
    a DSL receiver;
    a reference AM radio frequency signal receiver to receive an AM interference with an antenna; and
    an AM interference canceller module to digitally sum to cancel a signal representative of AM interference and said AM interference within said DSL receiver, said signal representative of said AM interference being is based on a carrier component of said AM interference while ignoring a sideband component.

10. The digital subscriber line front end according to claim 9, wherein:
    said digital subscriber line is an asymmetric DSL (ADSL).

11. The digital subscriber line front end according to claim 9, further comprising:
    an adaptive circuit to determine an amount of differential mode coupling of said interfering AM radio signal with respect to an amount of common mode coupling of said interfering AM radio signal.

12. The digital subscriber line front end according to claim 12, wherein:
    said reference AM radio frequency signal is generated from a reference AM radio wave receiver.

13. The digital subscriber line front end according to claim 9, wherein:
    said reference AM radio frequency signal is generated from a carrier signal recovery phase locked loop.

14. The digital subscriber line front end according to claim 9, wherein said AM interference canceller comprises:
    a Hilbert bandpass filter.

15. The digital subscriber line front end according to claim 14, wherein said AM interference canceller further comprises:
    an FFT analyzer to determine a frequency of a most significant AM radio signal.

16. The digital subscriber line front end according to claim 14, wherein said AM interference canceller further comprises:
    an LMS module to adjust a frequency of I and Q channels of said Hilbert bandpass filter.

17. The digital subscriber line front end according to claim 9, wherein said AM interference canceller comprises:
    a carrier recovery phase locked loop tuned to a most significant frequency of an interfering AM radio signal;
    a sine gain adjustment to generate a sine signal relating to said most significant frequency; and
    a cosine gain adjustment to generate a cosine signal relating to said most significant frequency.

18. A method of canceling an AM interference signal from a digital subscriber line signal, comprising:
    detecting an AM interference signal with an antenna before said AM interference signal reaches a hybrid;
    generating an AM interference cancellation signal from said AM interference signal, said AM interference cancellation signal is based on a carrier component of said AM interference signal while ignoring a sideband component; and combining said generated AM interference cancellation signal with said digital subscriber line signal at said hybrid in a digital summer.

19. The method of canceling an AM interference signal from a digital subscriber line signal according to claim 18, further comprising:

determining an amount of differential mode coupling of said interfering AM radio signal in said digital subscriber line signal.

20. The method of canceling an AM interference signal from a digital subscriber line signal according to claim 18, further comprising:

determining an amount of common mode coupling of said interfering AM radio signal in said digital subscriber line signal.

21. The method of canceling an AM interference signal from a digital subscriber line signal according to claim 18, further comprising:

determining a ratio of an amount of differential mode coupling of said interfering AM radio signal with respect to an amount of common mode coupling of said interfering AM radio signal.

22. The method of canceling an AM interference signal from a digital subscriber line signal according to claim 18, wherein:

said DSL receiver is an ADSL receiver.

23. A The method of canceling an AM interference signal from a digital subscribe line signal, comprising:

detecting an AM interference signal with an antenna before said AM interference signal reaches a hybrid;

generating an AM interference cancellation signal from said AM interference signal using a Hilbert bandpass filter, said AM interference cancellation signal is based on a carrier component of said AM interference signal while ignoring a sideband component; and combining said generated AM interference cancellation signal with said digital subscriber line signal at said hybrid.

24. The method of canceling an AM interference signal from a digital subscriber line signal according to claim 23, further comprising:

adjusting a bandpass frequency of said Hilbert bandpass filter using an LMS algorithm.

25. The method of canceling an AM interference signal from a digital subscriber line signal according to claim 24, further comprising:

providing a coarse adjustment of said Hilbert bandpass filter with a determined carrier frequency.

26. The method of canceling an AM interference signal from a digital subscriber line signal according to claim 25, further comprising:

determining said determined carrier frequency using an FFT analyzer.

27. A The method of canceling an AM interference signal from a digital subscriber line, comprising:

detecting an AM interference signal with an antenna before said AM interference signal reaches a hybrid;

generating an AM interference cancellation signal using an AM carrier recovery PLL, followed by gain adjustments of cosine and sine phases of said recovered AM carrier signal, said AM interference cancellation signal being based on a carrier component of said AM interference signal while ignoring a sideband component; and combining said generated AM interference cancellation signal with said digital subscriber line signal at said hybrid.

28. The method of canceling an AM interference signal from a digital subscriber line signal according to claim 27, further comprising:

adjusting said gain adjustments based on an LMS algorithm.

29. Apparatus for canceling an AM interference signal from a digital subscriber line signal, comprising:

means for detecting an AM interference signal with an antenna before said AM interference signal reaches a hybrid;

means for generating an AM interference cancellation signal from said AM interference signal, said AM interference cancellation signal is based on a carrier components of said AM interference signal while ignoring a sideband component; and means for combining said generated AM interference cancellation signal with said digital subscriber line signal at said hybrid in a digital summer.

30. The apparatus for canceling an AM interference signal from a digital subscriber line signal according to claim 29, further comprising:

means for determining an amount of differential mode coupling of said interfering AM radio signal in said digital subscriber line signal.

31. The apparatus for canceling an AM interference signal from a digital subscribe line signal according to claim 29, wherein:

said AM interference cancellation signal is generated using a Hilbert bandpass filter.

* * * * *